(12) United States Patent
Liaigre et al.

(10) Patent No.: US 11,623,590 B2
(45) Date of Patent: Apr. 11, 2023

(54) ELECTRICAL CONNECTOR COVER

(71) Applicant: Lear Corporation, Southfield, MI (US)

(72) Inventors: Laurent Liaigre, Coventry (FR); Vincent Delaunay, Ormoy-la-Rivière (FR)

(73) Assignee: Lear Corporation, Southfield, MI (US)

( * ) Notice: Subject to any disclaimer, the term of this patent is extended or adjusted under 35 U.S.C. 154(b) by 149 days.

(21) Appl. No.: 17/144,801

(22) Filed: Jan. 8, 2021

(65) Prior Publication Data

US 2022/0219625 A1 Jul. 14, 2022

(51) Int. Cl.
*B60R 16/02* (2006.01)
*H01R 13/52* (2006.01)
*B60R 22/48* (2006.01)
*B60N 2/90* (2018.01)

(52) U.S. Cl.
CPC ............ *B60R 16/0215* (2013.01); *B60N 2/90* (2018.02); *B60R 22/48* (2013.01); *H01R 13/5213* (2013.01); *B60R 2022/4808* (2013.01); *B60R 2022/4866* (2013.01); *H01R 2201/26* (2013.01)

(58) Field of Classification Search
CPC ............ B60N 2002/0264; H02G 3/081; B60R 16/0207; B60R 16/0215; B60R 16/0238; B60R 16/0239
See application file for complete search history.

(56) References Cited

U.S. PATENT DOCUMENTS

| 5,871,364 A | 2/1999 | Shinchi et al. |
| 7,057,109 B2 | 6/2006 | Terada |
| 7,122,738 B2 | 10/2006 | Kanamaru |
| 7,507,094 B2 | 3/2009 | Kubota et al. |
| 8,188,368 B2 | 5/2012 | Suzuki |
| 9,024,183 B2 | 5/2015 | Sakakura |
| 9,481,327 B2 | 11/2016 | Shibata et al. |
| 9,743,545 B2 | 8/2017 | Nakashima et al. |
| 9,809,138 B2 | 11/2017 | Fuwa et al. |
| 10,027,100 B1 | 7/2018 | Nakano et al. |
| 10,103,526 B2 | 10/2018 | Suzuki et al. |
| 10,122,115 B2 | 11/2018 | Masuda et al. |
| 10,135,229 B2 | 11/2018 | Matsumura et al. |
| 10,237,995 B2 | 3/2019 | Nakano et al. |
| 10,680,378 B2 | 6/2020 | Miyazawa |
| 10,873,178 B2 | 12/2020 | Tokuyama et al. |
| 2008/0001464 A1* | 1/2008 | Mundell ............ B60N 2/7094 297/452.52 |

(Continued)

FOREIGN PATENT DOCUMENTS

| EP | 2214933 B1 | 4/2011 |
| EP | 2849970 B1 | 4/2016 |

(Continued)

*Primary Examiner* — Sarah B McPartlin
(74) *Attorney, Agent, or Firm* — Fishman Stewart PLLC

(57) ABSTRACT

A cover for an electrical connector may include an outer wall having a first edge and a second edge, a first side wall connected to a first end of the outer wall, a second side wall connected to a second end of the outer wall, a first clip portion disposed proximate the first edge and configured for rotational connection with a first wire frame portion, and/or a second clip portion disposed proximate the second edge configured for connection with a second wire frame portion.

20 Claims, 13 Drawing Sheets

(56) References Cited

U.S. PATENT DOCUMENTS

| | | | |
|---|---|---|---|
| 2015/0232009 A1* | 8/2015 | Jamieson | ............... B60N 2/682 |
| | | | 297/452.18 |
| 2019/0375347 A1 | 12/2019 | Kotani | |
| 2020/0169067 A1 | 5/2020 | Takahashi et al. | |
| 2022/0080860 A1* | 3/2022 | Kupietz | ............... B60N 2/5621 |

FOREIGN PATENT DOCUMENTS

| | | |
|---|---|---|
| EP | 2920026 B1 | 9/2016 |
| EP | 3172082 A1 | 5/2017 |
| FR | 2986482 A1 | 8/2013 |
| JP | 2010018106 A | 1/2010 |
| WO | WO-2014031868 A1 * 2/2014 | ......... B60R 16/0215 |
| WO | 2016/012678 A1 | 1/2016 |
| WO | WO-2016012678 A1 * 1/2016 | ........... B60N 2/1615 |

* cited by examiner

ELECTRICAL CONNECTOR COVER

TECHNICAL FIELD

The present disclosure generally relates to covers for connectors, including covers for electrical connectors that may, for example, be used in connection with vehicles and/or vehicle seats.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some designs may not adequately cover or protect connectors, such as electrical connectors. Some designs may be relatively complex, difficult to manufacture, and/or difficult to use.

There is a desire for solutions/options that minimize or eliminate one or more challenges or shortcomings of covers. The foregoing discussion is intended only to illustrate examples of the present field and is not a disavowal of scope.

SUMMARY

In embodiments, a cover for an electrical connector may include an outer wall having a first edge and a second edge, a first side wall connected to a first end of the outer wall, a second side wall connected to a second end of the outer wall, a first clip portion disposed proximate the first edge and configured for rotational connection with a first wire frame portion, and/or a second clip portion disposed proximate the second edge configured for connection with a second wire frame portion.

With embodiments, a vehicle and/or a vehicle seat may include a seat portion including a cover for an electrical connector, a wire frame including a first wire frame portion and a second wire frame portion, and/or an electrical connector connected to the outer wall. The cover may include an open position and a closed position. In the open position, a first clip portion of the cover may be clipped with the first wire frame portion. In the closed position, a second clip portion of the cover may be clipped with the second wire frame portion such that the electrical connector may not be substantially visible from a bottom of the vehicle seat.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1:
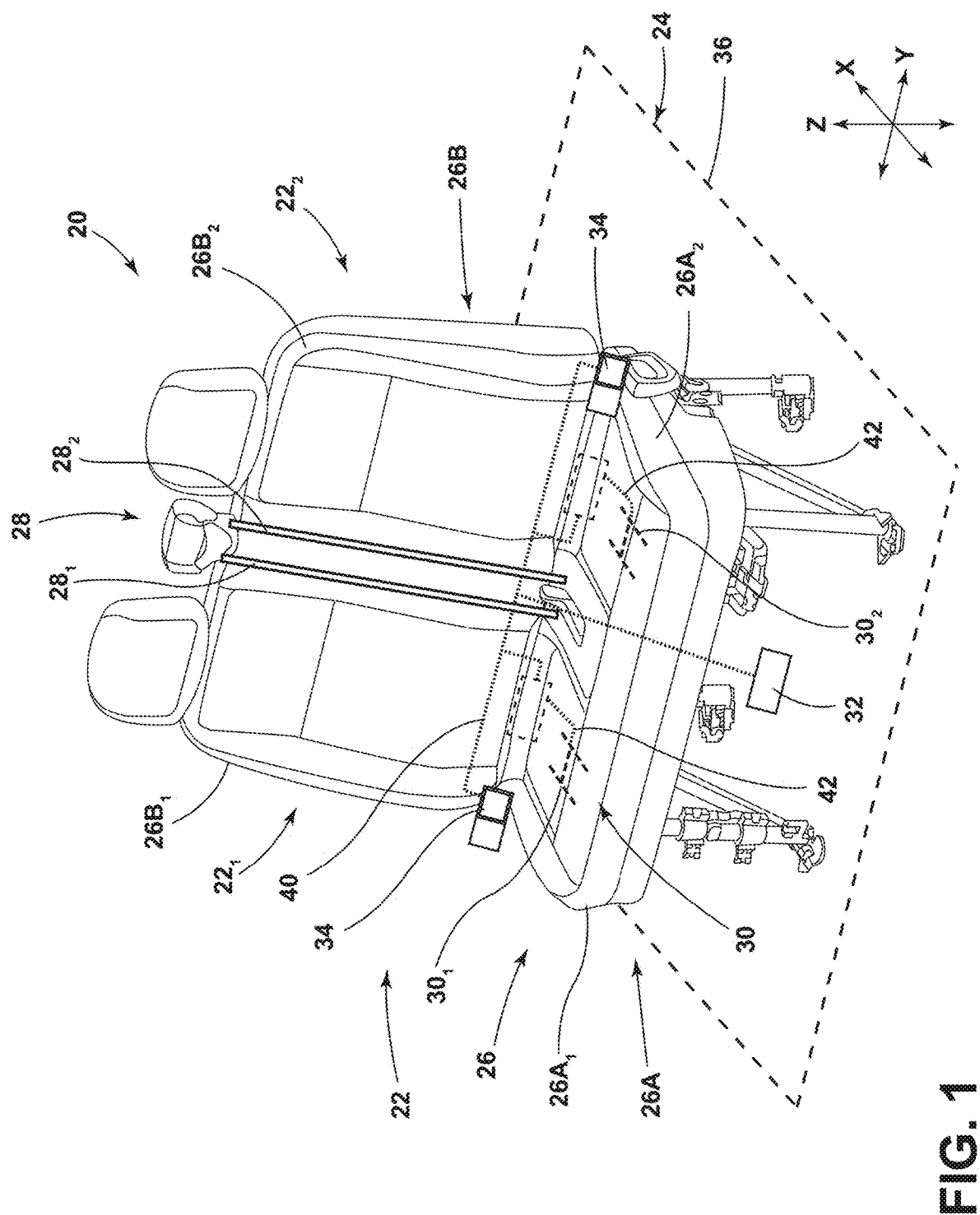
FIG. 1 is a perspective view generally illustrating an embodiment of a seat with electrical connector covers according to teachings of the present disclosure.

In embodiments, such as generally illustrated in FIG. 1, a seat 20 may include one or more seat portions 22, such as a first seat portion $22_1$ and/or a second seat portion $22_2$. The seat 20 may, for example, be connected to and/or disposed in a vehicle 24 (e.g., may be configured as a vehicle seat). A seat portion 22 may include one or more cushions 26, such as a base cushion 26A (e.g., base cushions $26A_1$, $26A_2$)

and/or a back cushion 26B (e.g., back cushions $26B_1$, $26B_2$). The base cushions $26A_1$, $26A_2$ may or may not be integrally formed with each other. The back cushions $26B_1$, $26B_2$ may or may not be integrally formed with each other. A seat 20 may include one or more seat belts 28, such as a first seat belt $28_1$ for the first seat portion $22_1$ and a second seat belt $28_2$ for the second seat portion $22_2$.

In embodiments, a seat 20 may include one or more sensors 30, such as a first sensor $30_1$ and/or a second sensor $30_2$. The one or more sensors 30 may be connected to and/or disposed in a cushion 26. For example and without limitation, a first sensor $30_1$ may be connected to and/or disposed in a base cushion $26A_1$, and/or a second sensor $30_2$ may be connected to and/or disposed in a base cushion $26A_2$.

With embodiments, a sensor 30 may include a seat belt reminder (SBR) sensor that may be configured for detecting whether a seat belt 28 should be in use (e.g., whether the seat 20 or seat portion 22 is occupied by a user). For example and without limitation, a sensor 30 may include one or more occupancy/pressure sensors that may provide an electrical signal indicative of whether the seat is occupied. A controller 32 (e.g., an electronic controller, which may include an electronic processor and/or memory) may be electrically connected to the sensor 30 and may determine whether to provide a reminder to use a seat belt, at least in part, according to information from the sensor 30. For example, if the controller 32 obtains information from a sensor 30 that a seat 20 is occupied and a seat belt 28 is not in use (e.g., via a seat buckle sensor 34), the controller 32 may provide a reminder (e.g., audible, visual, etc.) to the user to use a seat belt 28.

Figure 2:
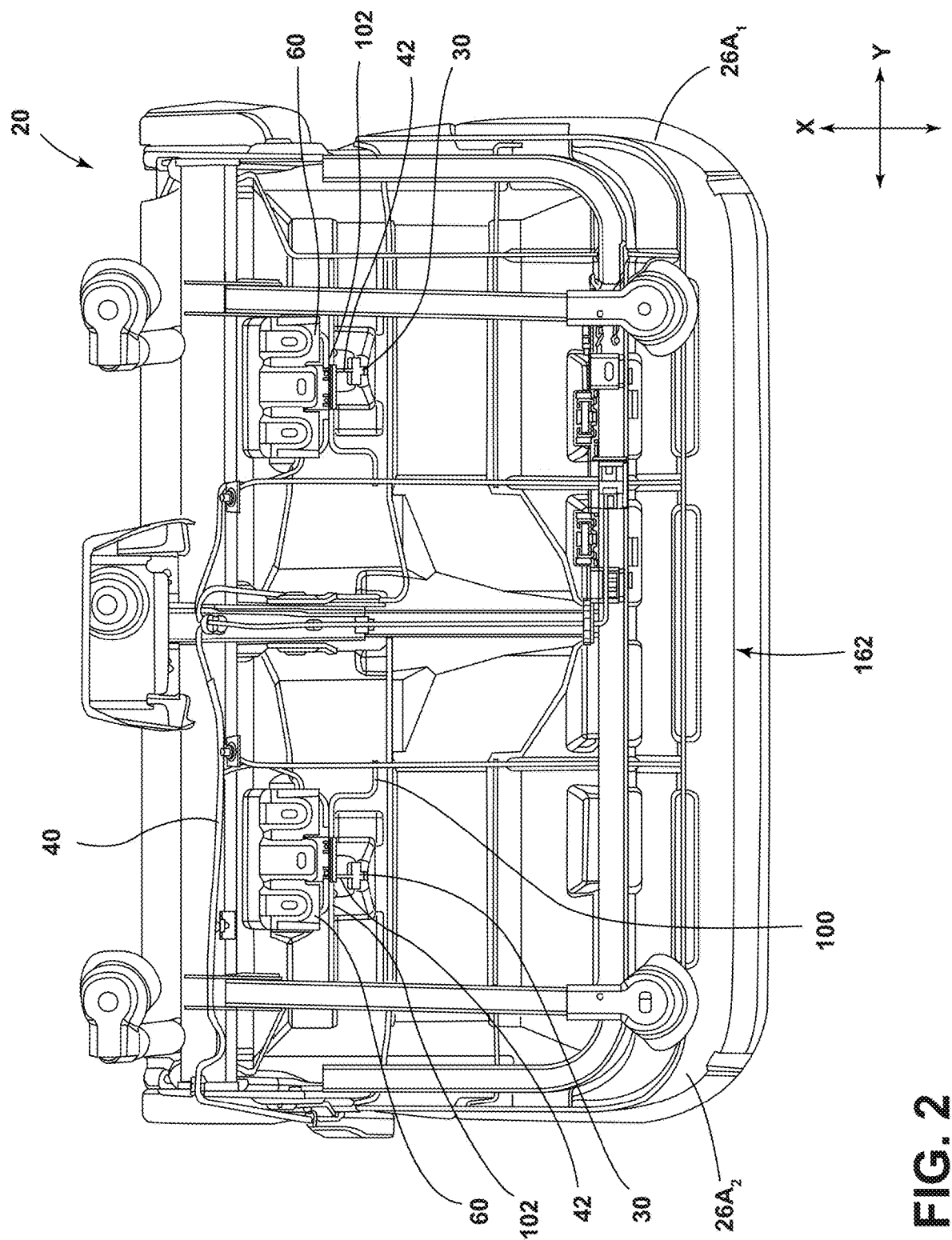
FIG. 2 is a bottom view generally illustrating an embodiment of a seat with electrical connector covers according to teachings of the present disclosure.

In embodiments, such as generally illustrated in FIG. 2, a seat 20 may include a wiring harness 40 that may electrically connect one or more sensors 30 and/or one or more seat buckle sensors 34, such as to a controller 32. A sensor 30 may include a wire or cable 42 that may be connected to the harness 40, such as via an electrical connector 50 (see, e.g., FIG. 3). The electrical connector 50 may include a first connector portion 52 that may be connected to the wire or cable 42 of the sensor 30, and/or may include a second connector portion 54 that may be configured for mating (e.g., electrically and mechanically) with the first connector portion 52. The second connector portion 54 may be connected to and/or part of the harness 40.

Figure 3:
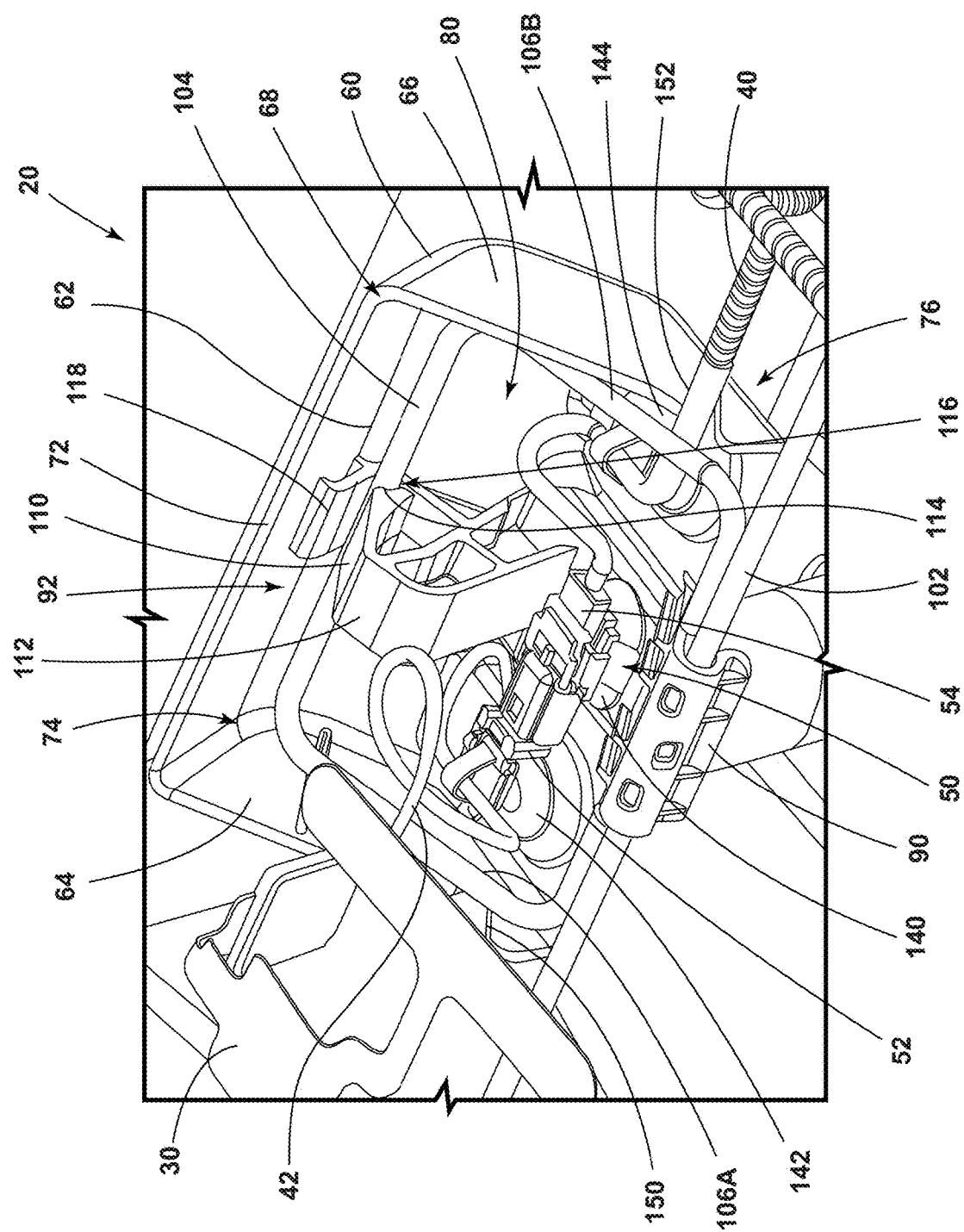
FIG. 3 is a partial perspective view generally illustrating an embodiment of a seat with an electrical connector cover in a closed position according to teachings of the present disclosure.
Figure 4:
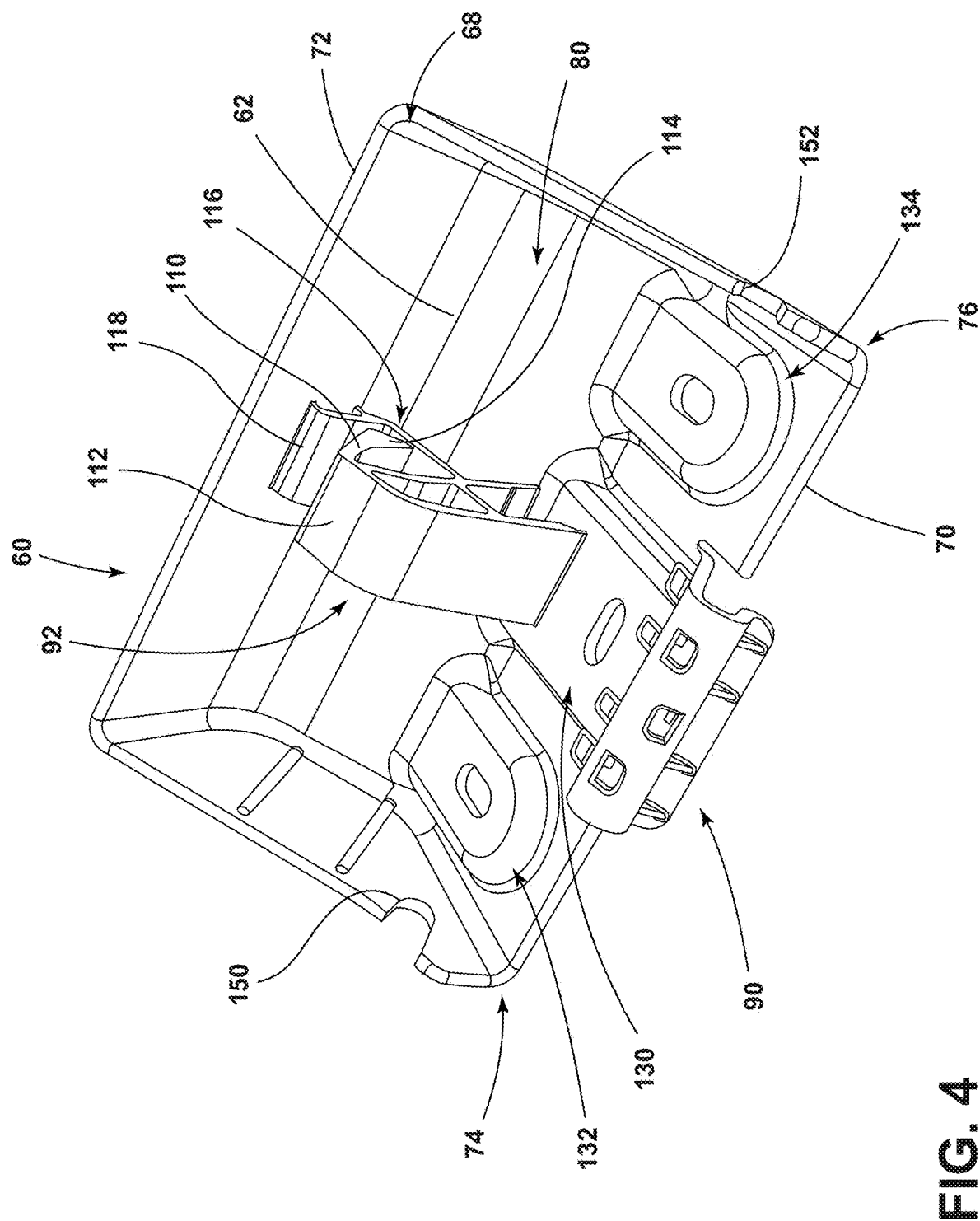
FIG. 4 is a perspective view generally illustrating an embodiment of an electrical connector cover according to teachings of the present disclosure.
Figure 5:
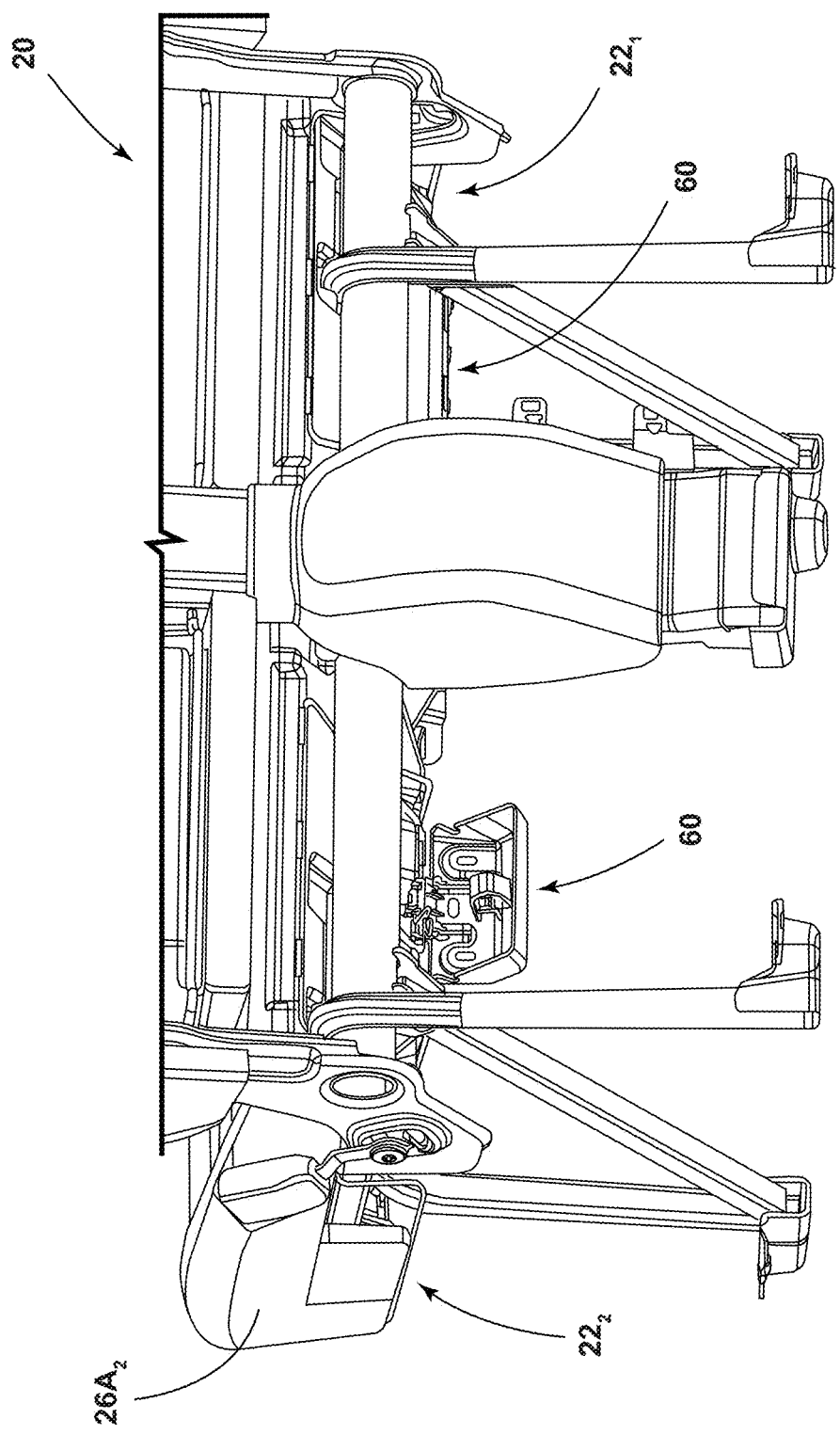
FIG. 5 is a perspective view generally illustrating an embodiment of a seat with one electrical connector cover in an open position and one electrical connector cover in a closed position according to teachings of the present disclosure.

With embodiments, such as generally illustrated in FIGS. 2-4, a seat 20 may include a cover 60 that may be configured to at least partially cover, protect, and/or retain the electrical connector 50 (e.g., may be configured as an electrical connector cover). The cover 60 may include an outer wall 62, a first side wall 64, and/or a second side wall 66. The outer wall 62 may include a first edge 70 and/or a second edge 72, and may be curved and/or angled between the first edge 70 and the second edge 72. The first side wall 64 may be disposed at or about a first end 74 of the outer wall 62. The second side wall 66 may be disposed at or about a second end 76 of the outer wall 62. For example and without limitation, the first side wall 64 and/or the second side wall 66 may extend from the first edge 70 to the second edge 72 at opposite ends 74, 76 of the outer wall 62. The outer wall 62, the first side wall 64, and the second side wall 66 may at least partially define an internal space 80 that may, for example, include a generally semi-cylindrical shape.

In embodiments, a cover 60 may include a first clip portion 90 and/or a second clip portion 92. The first clip portion 90 may be disposed at or about the first edge 70, and/or may extend from/beyond the first edge 70 (e.g., away from the outer wall 62). The first clip portion 90 may be configured for connection with the seat 20, such as with a wire frame 100 of the seat 20. The wire frame 100 may be disposed in and/or under the cushions 26A, 26B. The wire frame 100 may, for example, be configured to at least partially support the cushions 26A, 26B and/or occupants of the seat 20 (or items stored thereon).

Figure 6:
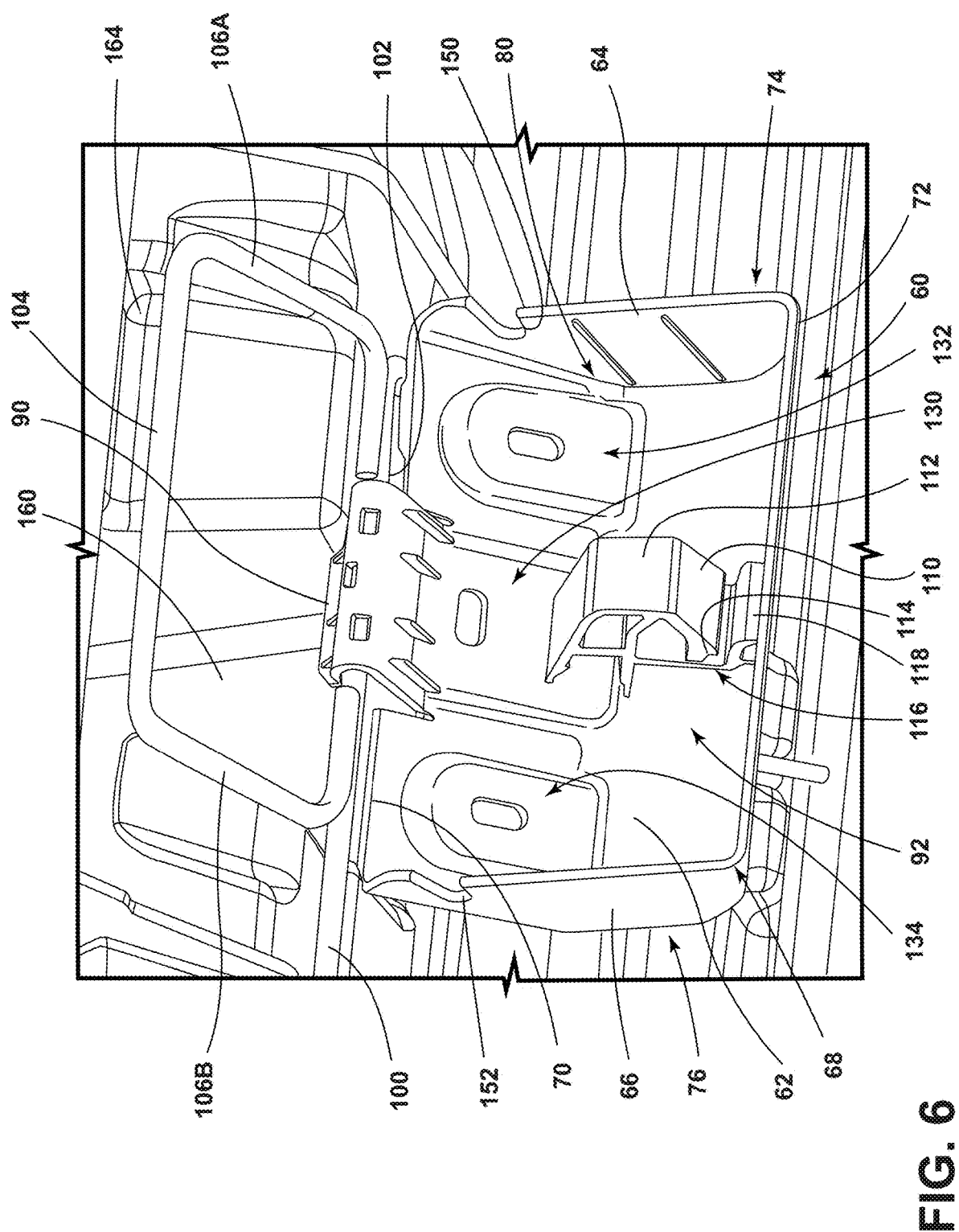
FIG. 6 is a partial perspective view generally illustrating an embodiment of a seat with an electrical connector cover in an open position according to teachings of the present disclosure.
Figure 7:
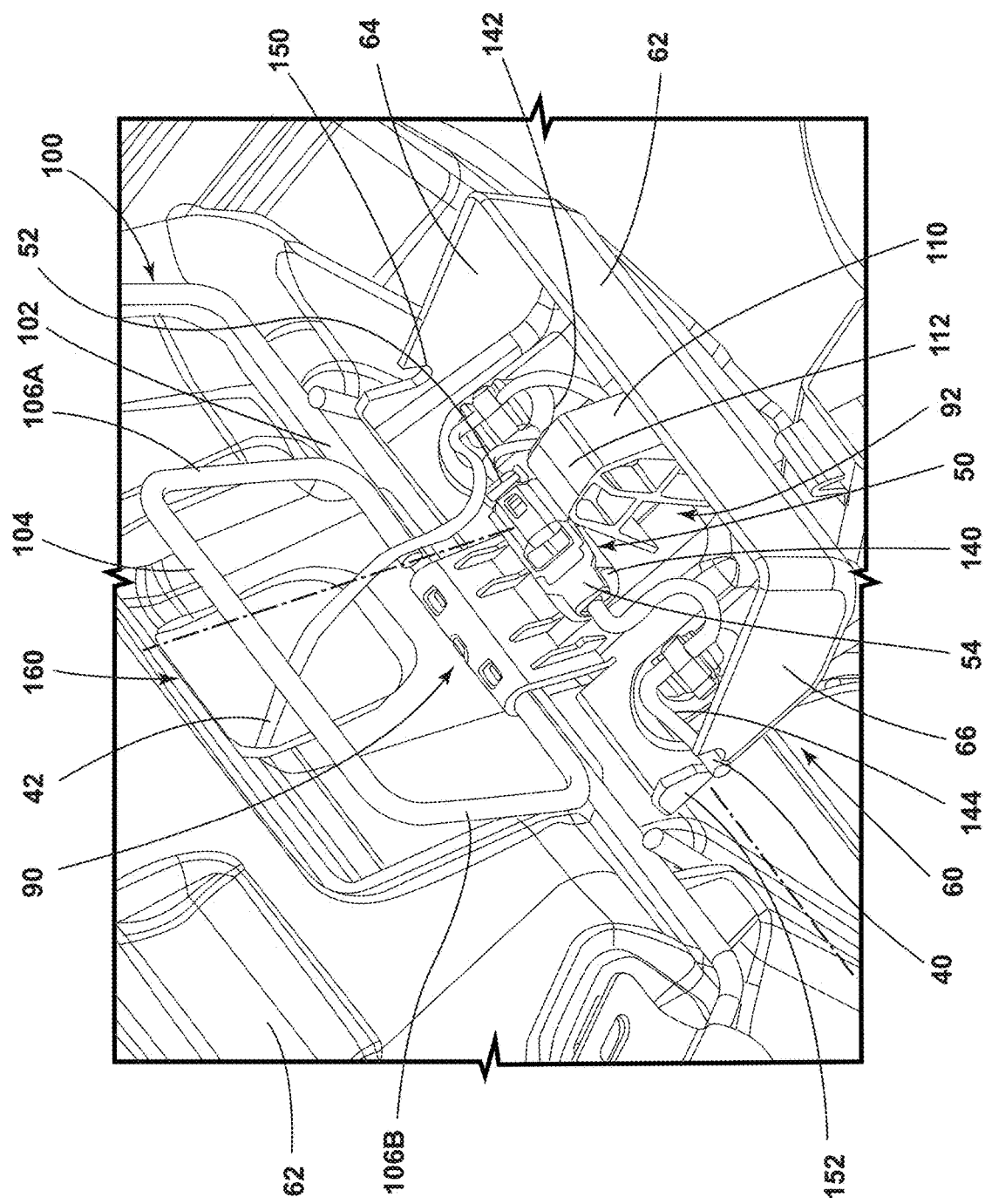
FIG. 7 is a partial perspective view generally illustrating an embodiment of a seat with an electrical connector cover in an open position according to teachings of the present disclosure.
Figure 8:
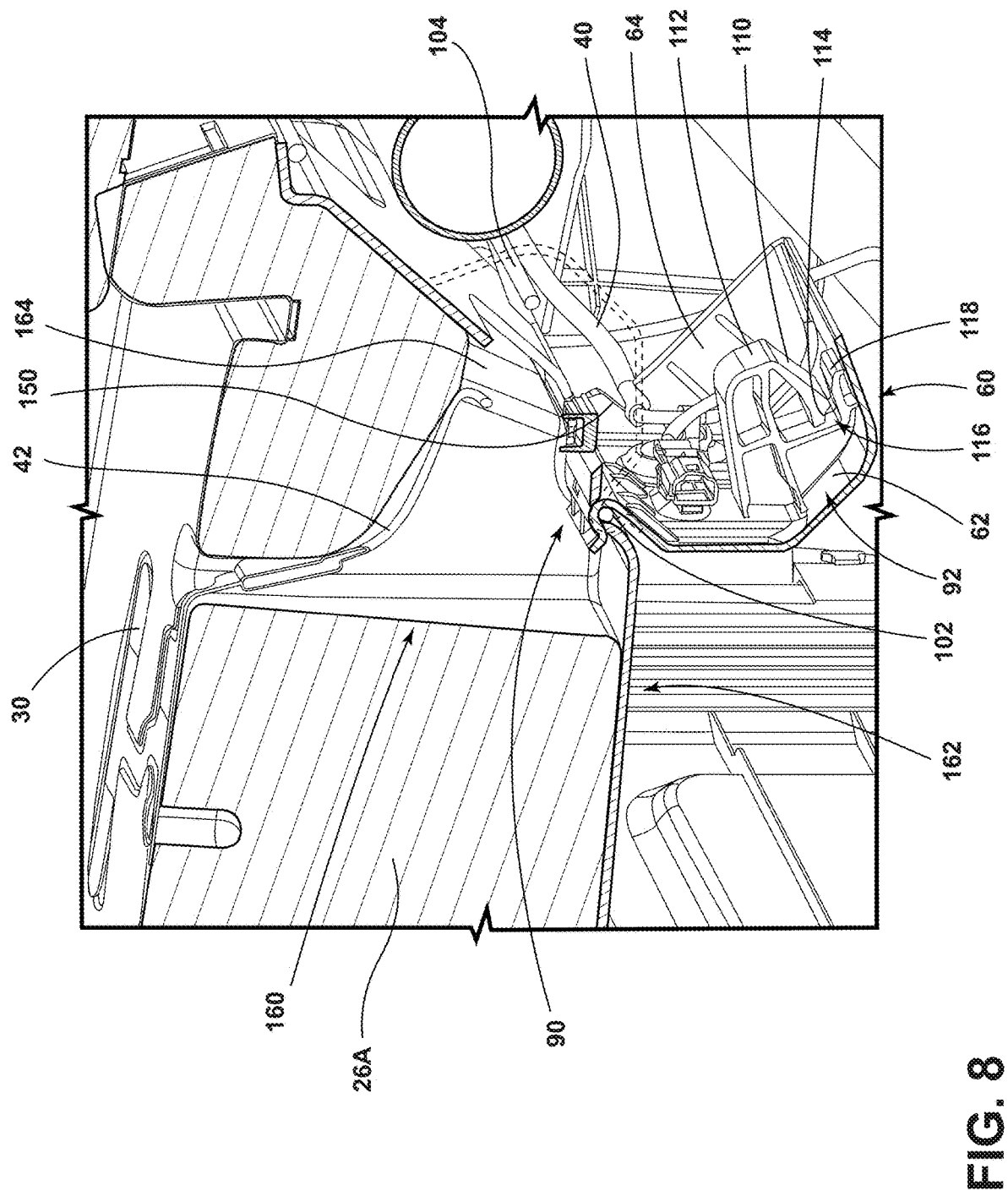
FIG. 8 is a partial cross-sectional perspective view generally illustrating an embodiment of a seat with an electrical connector cover in an open position according to teachings of the present disclosure.
Figure 9:
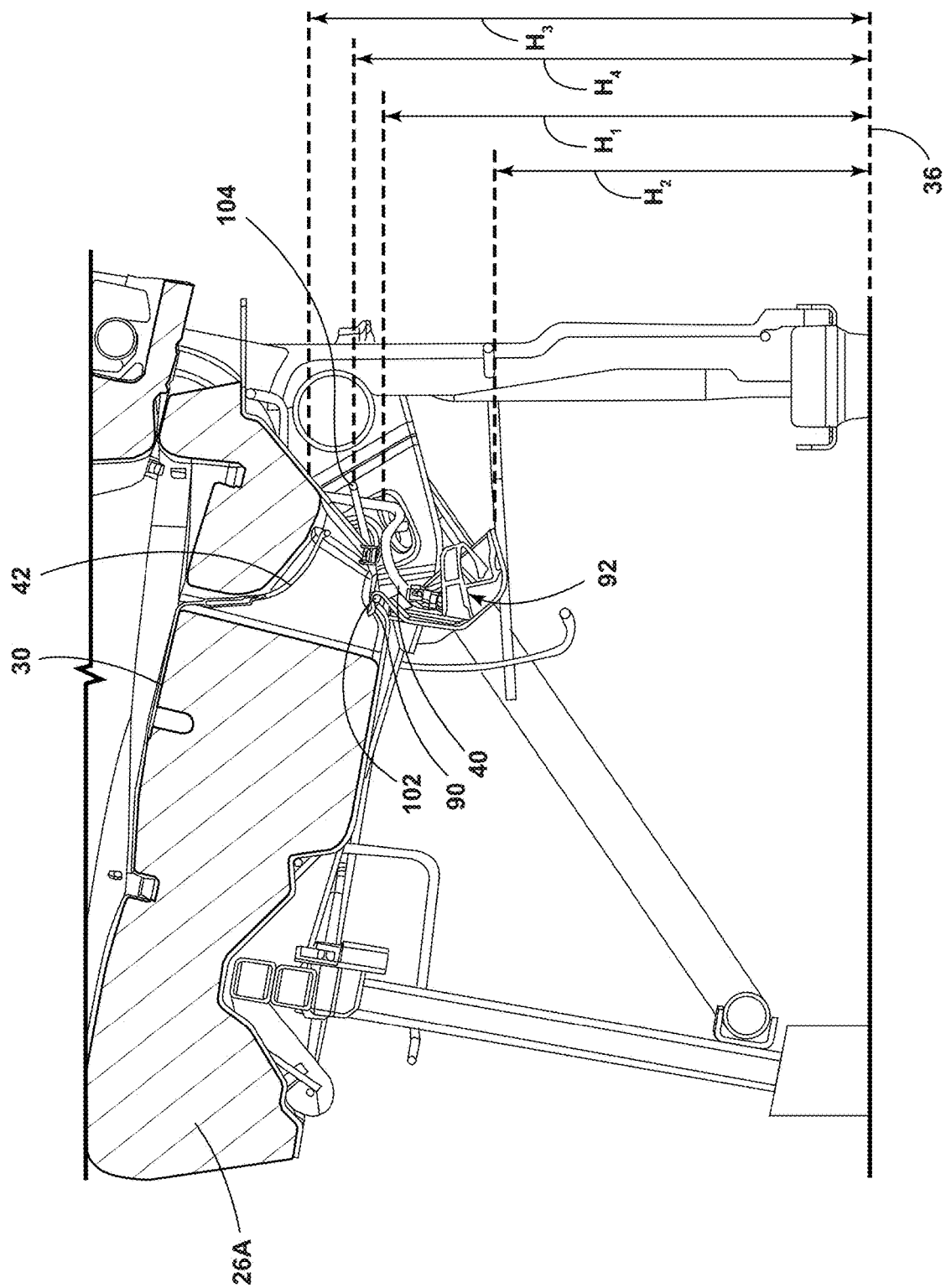
FIG. 9 is a cross-sectional view generally illustrating an embodiment of a seat with an electrical connector cover in an open position according to teachings of the present disclosure.
Figure 10:
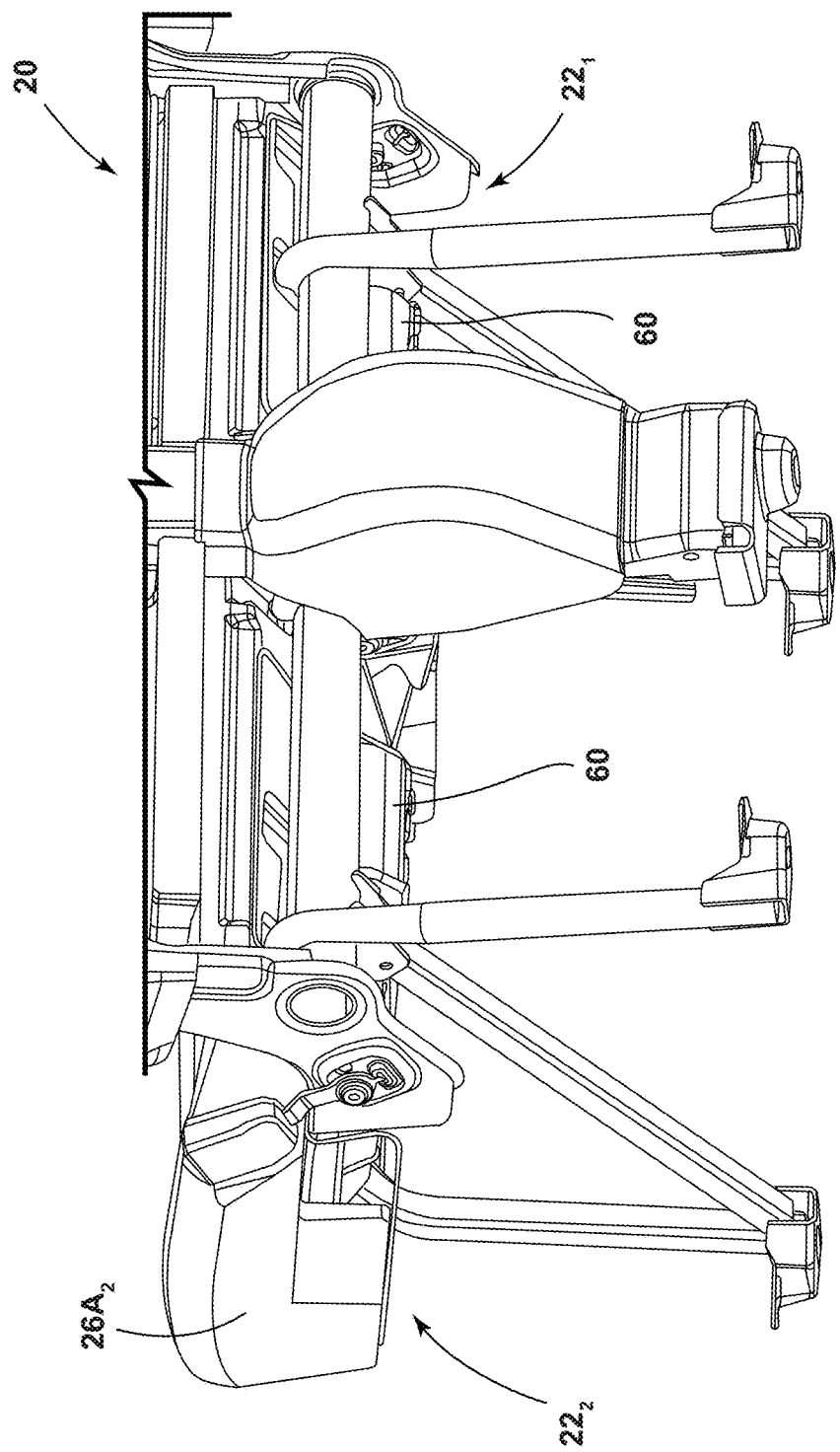
FIG. 10 is a perspective view generally illustrating an embodiment of a seat with two electrical connector covers in closed positions according to teachings of the present disclosure.

With embodiments, such as generally illustrated in FIG. 6, a wire frame 100 may include a first wire frame portion 102 and/or a second wire frame portion 104 that may be offset from each other and/or that may be substantially parallel to each other. For example and without limitation, the first wire frame portion 102 and the second wire frame portion 104 may be substantially parallel with a Y-direction (e.g., a transverse direction) of the seat 20 and may be offset from each other in an X-direction (e.g., a longitudinal direction) and/or a Z-direction (e.g., a vertical direction) of the seat 20. The second wire frame portion 104 may, for example, be disposed rearward of and higher than the first wire frame portion 102.

In embodiments, such as generally illustrated in FIGS. 3 and 6-12, the first clip portion 90 may be configured for connection (e.g., a rotational connection) with the first wire frame portion 102. For example and without limitation, the first clip portion 90 may include a hooked configuration that may hook/snap at least partially over the first wire frame portion 102, and the cover 60 may rotate about the first wire frame portion 102 via the first clip portion 90 (e.g., about an axis that may be substantially parallel with the first wire frame portion 102 and/or a Y-direction). The internal space 80 and the first clip portion 90 may open in opposite directions (e.g., the outer wall 62 and the first clip portion 90 may provide the cover 60 with a generally S-shaped cross-section, although the clip portion 90 may be significantly smaller than the outer wall 62.

With embodiments, such as generally illustrated in FIGS. 3 and 10-12, the second clip portion 92 may be configured for connection with the second wire frame portion 104. The second clip portion 92 may include a resilient latch member 110 that may extend inward from an outer end 112 of the second clip portion 92 toward the outer wall 62. The latch member 110 may be angled/tapered to facilitate insertion of the second wire frame portion 104 (e.g., toward the outer wall 62). The latch member 110 may include a recess 114 configured to at least partially receive the second wire frame portion 104 (e.g., may be rounded, and/or may correspond to a diameter of the second wire frame portion 104). In a connected position of the second clip portion 92 with the second wire frame portion 104, at least some of the second wire frame portion 104 may be disposed and/or retained in a space 116 defined at least in part by the recess 114 and an inner wall 118 of the second clip portion 92. The inner wall 118 may be disposed at and/or connected to an inner surface of the outer wall 62. The recess 114 and/or the space 116 may be disposed partially or completely in the internal space 80 of the cover 60.

In embodiments, such as generally illustrated in FIG. 4, a cover 60 may include a first mounting portion 130 (e.g., a connector mounting portion). The first mounting portion 130 may be configured for connection with the electrical connector 50 (see, e.g., FIG. 3). For example and without limitation, the first mounting portion 130 may include a slot that may extend through the outer wall 62 and may be configured to at least partially receive the second connector portion 54 of the electrical connector 50 and/or a first clip portion 140 (e.g., clip, latch, holder, etc.) connected thereto. The second connector portion 54 may be directly connected to the cover 60 via the first mounting portion 130 and/or the first clip portion 140. The first connector portion 52 may be indirectly connected to the cover 60 via the second connector portion 54, the first mounting portion 130, an/or the first clip portion 140.

With embodiments, such as generally illustrated in FIG. 4, a cover 60 may include a second mounting portion 132 (e.g., a sensor cable mounting portion) and/or a third mounting portion 134 (e.g., a harness mounting portion). The second mounting portion 132 may be configured for connection with a sensor cable 42. The third mounting portion 134 may be configured for connection with a harness 40. For example and without limitation, a second clip portion 142 may be connected with the second mounting portion 132, which may be configured as a second slot in/that extends through the outer wall 62, and may be connected to and/or at least partially retain the sensor cable 42. Additionally or alternatively, a third clip portion 144 may be connected with the third mounting portion 134, which may be configured as a third slot in/that extends through the outer wall 62, and may be connected to and/or at least partially retain the harness 40. The second mounting portion 132 and the third mounting portion 134 may be disposed at opposite sides of the first mounting portion 130.

In embodiments, such as generally illustrated in FIG. 4, a cover 60 may include a first recess 150 and/or a second recess 152, which may be configured as slots. The first side wall 64 may include the first recess 150, and/or the second side wall 66 may include the second recess 152. The first recess 150 may extend from an edge of the first side wall 64. The second recess 152 may extend from an edge of the second side wall 66. The first recess 150 and/or the second recess 152 may be configured to receive a cable/harness, such as a harness 40 and/or a sensor cable 42, such that the cable/harness may pass through the first side wall 64 into the internal space 80 for connection with the electrical connector 50. With embodiments, a sensor cable 42 may extend into an open side 68 of the cover 60 and may not pass through the first side wall 64 or the first recess 150. The first recess 150 may be configured to receive a harness 40, such as if the harness 40 is provided at the other side of the cover 60. In some circumstances, one of the first recess 150 and the second recess 152 may not be used (e.g., may be empty).

In embodiments, a cover 60 may be a monolithic component. For example and without limitation, the outer wall 62, the first side wall 64, the second side wall 66, the first clip portion 90, the second clip portion 92, the first mounting portion 130, the second mounting portion 132, and/or the third mounting portion 134 may be formed as a single, unitary component.

With embodiments, a cover 60 may be configured to move (e.g., rotate) between an open position, such as generally illustrated in FIGS. 5-9, and a closed position, such as generally illustrated in FIGS. 3 and 10-12. The cover 60 may, for example, rotate about the first wire frame portion 102 between open and closed positions. In the open position, the first clip portion 90 may be connected/clipped with the first wire frame portion 102, and/or the second clip portion 92 may not be connected/clipped with the second wire frame portion 104. The first wire frame portion 102 may be disposed at a first height $H_1$ from a mounting surface 36 (e.g., a floor of a vehicle 24). In the open position, the second edge 72 of the outer wall 62 may be disposed at a second height $H_2$ that may be about the same as or shorter than the first height $H_1$. In the open position, an open side 68 of the cover 60 may, for example, face generally in an X-direction (e.g., rearward).

In embodiments, in a closed position of the cover 60, the first clip portion 90 may be connected/clipped with the first wire frame portion 102 and/or the second clip portion 92 may be connected/clipped with the second wire frame portion 104. In the closed position, the second edge 72 of the outer wall 62 may be disposed at a third height $H_3$ that may be taller than the first height $H_1$, such that the second edge 72 may be disposed higher than the first edge 70, which may remain at substantially the same height in the open and closed positions. In the closed position, an open side 68 of the cover 60 may face generally in a Z-direction (e.g., upward, away from a mounting surface 36). The second wire frame portion 104 may be disposed at a fourth height $H_4$, which may be taller than the first height $H_1$ (e.g., the second wire frame portion 104 may be disposed at a greater height than the first wire frame portion 102) and/or shorter than the third height $H_3$.

Figure 11:
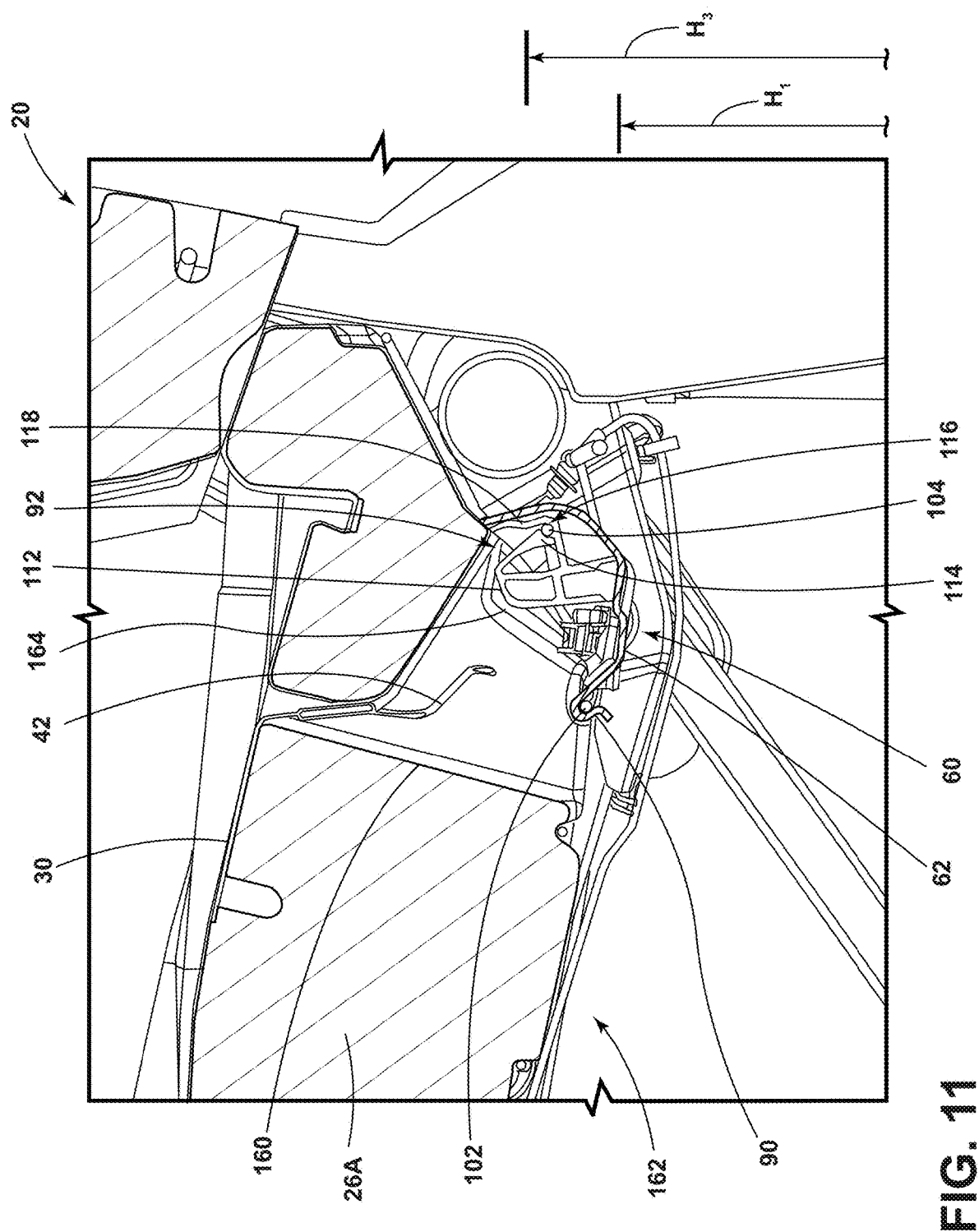
FIG. 11 is a partial cross-sectional view generally illustrating an embodiment of a seat with an electrical connector cover in a closed position according to teachings of the present disclosure.
Figure 12:
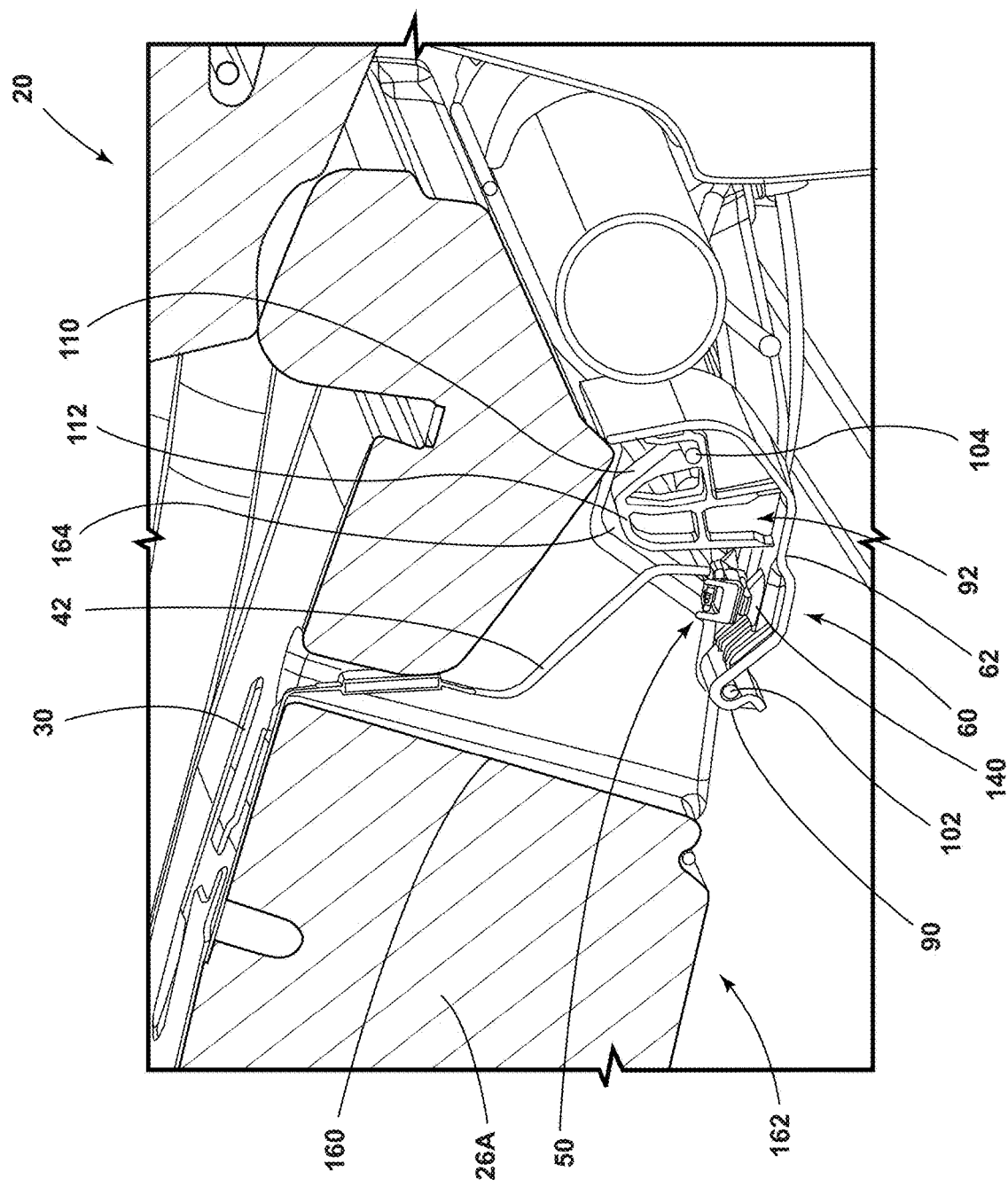
FIG. 12 is a partial cross-sectional perspective view generally illustrating an embodiment of a seat with an electrical connector cover in a closed position according to teachings of the present disclosure.

With embodiments, such as generally illustrated in FIGS. 11 and 12, in a closed position of the cover 60, an open side 68 of the cover 60 may, at least partially, be closed off (e.g., from above) by a cushion 26A and/or another part of the seat 20. The cushion 26A may include an aperture 160 that may extend at least partially through the cushion 26A. The aperture 160 may be configured to receive a sensor cable 42, such as to facilitate connection of the sensor cable 42 to the sensor 30 and the first connector portion 52. In embodiments, the aperture 160 may be disposed such that the aperture 160 is at least partially aligned with an open side 68 of the cover 60 when the cover 60 is in a closed position, which may allow for a sensor cable 42 to extend from a sensor 30 down through a cushion 26A into the open side 68 of the cover 60 (e.g., without passing through a side wall 64, 66 or the outer wall 62).

In embodiments, such as generally illustrated in FIGS. 11 and 12, a lower surface 162 of a cushion 26A may include a recessed portion 164. The lower surface 162 may face the mounting surface 36. The recessed portion 164 may be connected to and/or extend from the cushion aperture 160. In a closed position of the cover 60, at least a portion of the second clip portion 92 may be disposed in the recessed portion 164. For example and without limitation, the second clip portion 92 may extend from the outer wall 62 at least partially beyond the internal space 80 such that in a closed position of the cover 60, an outer end 112 of the second clip portion 92 is at least partially disposed in the recessed portion 164.

With embodiments, a cover 60 may be configured to protect an electrical connector 50, such as from damage that may occur from contact by a user or by cargo/debris that may move proximate the electrical connector 50. In a closed position of the cover 60, the electrical connector 50 may, for example, not be visible from an underside of the seat 20 (e.g., looking up at a lower surface 162 of a cushion 26A in a Z-direction), from one or both X-directions, and/or from one or both Y-directions. In an open position, the electrical connector 50 may be visible from an underside of the seat 20, from an X-direction, and/or one or both Y-directions. In some embodiments, in the closed position of the cover 60, the second clip portion 92 may not be readily accessible, and opening the cover 60 from a closed position may involve deforming and/or permanently breaking a latch member 110.

In embodiments, such as generally illustrated in FIGS. 3, 11, and 12, in a closed position of the cover 60, some, a majority, and/or substantially all of the second wire frame portion 104 may be disposed in the internal space 80. The second wire frame portion 104 may, for example, be connected to the first wire frame portion 102 by a pair of arms 106A, 106B that may extend substantially perpendicular to the second wire frame portion 104 and may be fixed (e.g., welded) to the first wire frame portion 102. In a closed position of the cover 60, some, a majority, and/or all of the arms 106A, 106B may be disposed in the internal space 80.

With embodiments, a first clip portion 90 and a second clip portion 92 may connect with/engage a wire frame 100 in different configurations and/or directions. For example and without limitation, in a closed position of the cover 60, a first clip portion 90 may be clipped over a top of a first wire frame portion 102, and/or a second clip portion 92 may be clipped from an underside of a second wire frame portion 104.

With embodiments, such as generally illustrated in FIGS. 1, 2, 5, and 10, a seat 20 may include a sensor 30 (e.g., sensors $30_1$, $30_2$) for some or each seat portion 22 (e.g., seat portions $22_1$, $22_2$), and the sensors $30_1$, $30_2$ may include seat belt reminder sensors for respective seat portions $22_1$, $22_2$. The two sensors $30_1$, $30_2$ may be connected to respective sensor cables 42. A harness 40 (e.g., a single wiring/vehicle harness) may be connected to a first sensor $30_1$ (e.g., via a first sensor cable 42), a second sensor $30_2$ (e.g., via a second sensor cable 42), a seat buckle sensor 34 of the first seat portion $22_1$, a seat buckles sensor 34 of the second seat portion $22_2$, and/or a controller 32. The seat 20 may include a cover 60 for each seat portion $22_1$, $22_2$ and/or each electrical connector 50.

Figure 13:
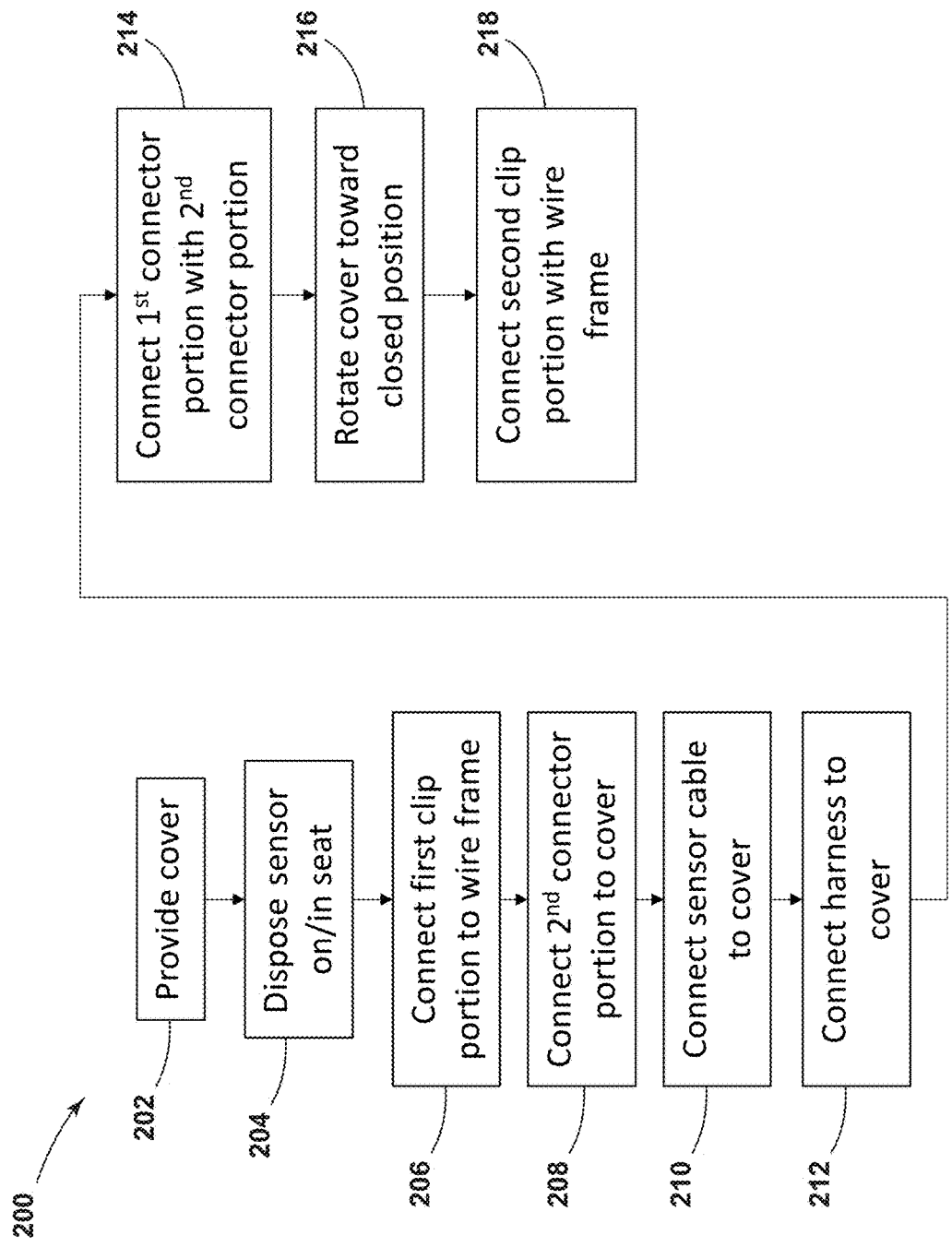
FIG. 13 is a flow diagram generally illustrating an embodiment of a method of utilizing an electrical connector cover according to teachings of the present disclosure.

In embodiments, such as generally illustrated in FIG. 13, a method 200 of utilizing an electrical connector cover 60 may include providing an electrical connector cover 60 (block 202), disposing a sensor 30 on and/or in a seat 20 (e.g., a cushion 26A) (block 204), connecting (e.g., snapping) a first clip portion 90 of the cover 60 with a first wire frame portion 102 of a seat 20 (block 206), connecting a second connector portion 54 to a first mounting portion 130 of the cover 60 (block 208), connecting a sensor cable 42 with a second mounting portion 132 of the cover 60 (block 210), connecting a harness 40 (e.g., a vehicle wiring harness) to a third mounting portion 134 of the cover 60 (block 212), connecting (e.g., electrically mating) a first connector portion 52 with the second connector portion 54 (block 214), rotating the cover 60 about the first wire frame portion 102 toward a closed position (block 216), and/or connecting (e.g., snapping) a second clip portion 92 of the cover 60 with a second wire frame portion 104 of the seat 20 (block 218), which may protect the electrical connector 50 from damage and/or unintended disconnection.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. A cover for an electrical connector, the cover comprising:
   an outer wall having a first edge and a second edge;
   a first side wall connected to a first end of the outer wall;
   a second side wall connected to a second end of the outer wall;

a first clip portion disposed proximate the first edge and configured for rotational connection with a first wire frame portion; and
a second clip portion disposed proximate the second edge and configured for connection with a second wire frame portion;
wherein the outer wall, the first side wall, and the second side wall define an internal space that receives at least a portion of said electrical connector.

2. The cover of claim 1, wherein the cover is a monolithic component.

3. The cover of claim 1, wherein the second clip portion is configured for connection with the second wire frame portion such that the second wire frame portion is disposed at least partially in the internal space.

4. The cover of claim 1, wherein:
the first side wall extends along the first end of the outer wall from the first edge to the second edge; and
the second side wall extends along the second end of the outer wall from the first edge to the second edge.

5. The cover of claim 4, wherein the internal space has a generally semi-cylindrical shape.

6. The cover of claim 1, wherein:
the second clip portion includes a recess configured to at least partially receive said second wire frame portion;
the recess is disposed in the internal space; and
the second clip portion is disposed partially in the internal space and extends beyond the internal space.

7. The cover of claim 1, wherein:
the outer wall includes a first mounting portion for connecting said electrical connector with the outer wall; and
the first mounting portion is disposed between the first clip portion and the second clip portion.

8. The cover of claim 7, wherein the outer wall includes one or more additional mounting portions for connecting a sensor cable and/or a harness with the outer wall such that a portion of the sensor cable and/or the harness is disposed in the internal space.

9. The cover of claim 8, wherein:
the first side wall includes a first slot via which said sensor cable and/or said harness is passable through the first side wall into the internal space; and
the second side wall includes a second slot via which said sensor cable and/or said harness is passable through the second side wall into the internal space.

10. The cover of claim 1, wherein the first clip portion and the second clip portion are configured for connection with the first wire frame portion and the second wire frame portion, respectively, in different directions; and
the second clip portion includes a resilient latch member.

11. A vehicle seat, including:
a seat portion including:
the cover of claim 1;
a wire frame including the first wire frame portion and the second wire frame portion; and
an electrical connector connected to the outer wall.

12. The vehicle seat of claim 11, wherein the first wire frame portion is substantially parallel with the second wire frame portion;
the first wire frame portion and the second wire frame portion are offset in a longitudinal direction of the vehicle seat; and
the second wire frame portion is disposed at a greater height than the first wire frame portion.

13. The vehicle seat of claim 11, wherein the seat portion includes a cushion;

a sensor is connected to and/or disposed in the cushion for determining if the seat portion is occupied;
the electrical connector is disposed at least partially in the internal space; and
the sensor is electrically connected with a first connector portion of the electrical connector.

14. The vehicle seat of claim 13, wherein the electrical connector includes a second connector portion mated with the first connector portion and connected to a vehicle harness; and
the vehicle harness is connected to an electronic controller configured to provide a seat belt reminder to a user.

15. The vehicle seat of claim 14, wherein the seat portion includes a seat buckle sensor electrically connected to the vehicle harness.

16. A vehicle seat, comprising:
a wire frame including a first wire frame portion and a second wire frame portion;
a cover including:
an outer wall having a first edge and a second edge;
a first side wall connected to a first end of the outer wall;
a second side wall connected to a second end of the outer wall;
a first clip portion disposed proximate the first edge and configured for rotational connection with the first wire frame portion; and
a second clip portion disposed proximate the second edge and configured for connection with the second wire frame portion;
an electrical connector connected to the outer wall;
a sensor cable connected to the electrical connector and the outer wall; and
a harness connected to the electrical connector and the outer wall;
wherein the sensor cable extends through an open side of the cover; and
the harness extends through a slot of the first side wall or the second side wall.

17. A vehicle seat, comprising:
a wire frame including a first wire frame portion and a second wire frame portion;
a cover including:
an outer wall having a first edge and a second edge;
a first side wall connected to a first end of the outer wall;
a second side wall connected to a second end of the outer wall;
a first clip portion disposed proximate the first edge and configured for rotational connection with the first wire frame portion; and
a second clip portion disposed proximate the second edge and configured for connection with the second wire frame portion; and
an electrical connector connected to the outer wall;
wherein the first wire frame portion is substantially parallel with the second wire frame portion;
the first wire frame portion and the second wire frame portion are offset in a longitudinal direction of the vehicle seat;
the second wire frame portion is disposed at a greater height than the first wire frame portion;
the cover includes an open position and a closed position;
in the open position, the first clip portion is connected with the first wire frame portion; and in the closed position, the second clip portion is connected with the second wire frame portion such that the electrical connector is not substantially visible from a bottom of the vehicle seat.

18. The vehicle seat of claim 17, wherein the cover is configured to rotate about the first wire frame portion via the first clip portion between the open position and the closed position.

19. The vehicle seat of claim 18, wherein the first wire frame portion is disposed at a first height;
   when the cover is in the open position, the second edge is disposed at a second height;
   the first height is greater than the second height;
   in the closed position, the second edge is disposed at a third height; and
   the third height is greater than the first height.

20. The vehicle seat of claim 17, wherein the outer wall, the first side wall, and the second side wall define an internal space; and
   in the closed position, the second wire frame portion is disposed substantially in the internal space.

* * * * *